US008532071B2

(12) United States Patent
Seok

(10) Patent No.: US 8,532,071 B2
(45) Date of Patent: Sep. 10, 2013

(54) METHOD OF UPDATING PROXY INFORMATION

(75) Inventor: Yong Ho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 765 days.

(21) Appl. No.: 12/404,029

(22) Filed: Mar. 13, 2009

(65) Prior Publication Data

US 2009/0232119 A1 Sep. 17, 2009

Related U.S. Application Data

(60) Provisional application No. 61/036,522, filed on Mar. 14, 2008.

(51) Int. Cl.
*H04W 8/00* (2009.01)

(52) U.S. Cl.
USPC .......... 370/338

(58) Field of Classification Search
USPC .......... 370/338, 312, 349
See application file for complete search history.

(56) References Cited

U.S. PATENT DOCUMENTS

| | | | | |
|---|---|---|---|---|
| 6,751,659 | B1 * | 6/2004 | Fenger et al. | 709/223 |
| 7,508,803 | B2 * | 3/2009 | Emeott et al. | 370/338 |
| 7,782,835 | B2 * | 8/2010 | Gossain et al. | 370/349 |
| 2006/0056457 | A1 * | 3/2006 | Livet et al. | 370/475 |
| 2009/0003291 | A1 * | 1/2009 | Chu et al. | 370/338 |

FOREIGN PATENT DOCUMENTS

| | | | |
|---|---|---|---|
| KR | 10-2005-0091599 | A | 9/2005 |
| KR | 10-2007-0080191 | A | 8/2007 |
| KR | 10-2007-0093773 | A | 9/2007 |
| KR | 10-2007-0120002 | A | 12/2007 |

* cited by examiner

*Primary Examiner* — Mark Rinehart
*Assistant Examiner* — Mohammad Anwar
(74) *Attorney, Agent, or Firm* — Birch, Stewart, Kolasch & Birch, LLP

(57) ABSTRACT

A method of updating proxy information in a mesh network is provided. The method includes transmitting a first multi-hop management frame from a source mesh point (MP) to a destination MP, the first multi-hop management frame comprising a proxy update information element (IE) to update the source MP's proxy information, and receiving a second multi-hop management frame from the destination MP, the second multi-hop management frame comprising a proxy update confirmation IE in response to the first multi-hop management frame. When proxy information updated, flooding overhead may be released.

10 Claims, 12 Drawing Sheets

(SA) (Mesh SA) (Mesh DA) (DA)
STA MAP MP MPP STA
link Mesh link Mesh link link
Mesh path
End to End 802 communication
First multi-hop management frame S810
Second multi-hop management frame S820

FIG. 2

| Octets:1 | 1 | 1 | 4 | 4 | 4 | 4 | 2 |
|---|---|---|---|---|---|---|---|
| ID | Length | Version | Active Path Selection Protocol Identifier | Active Path Selection Metric Identifier | Congestion Control Mode Identifier | Channel Precedence | Mesh Capability |

FIG. 3

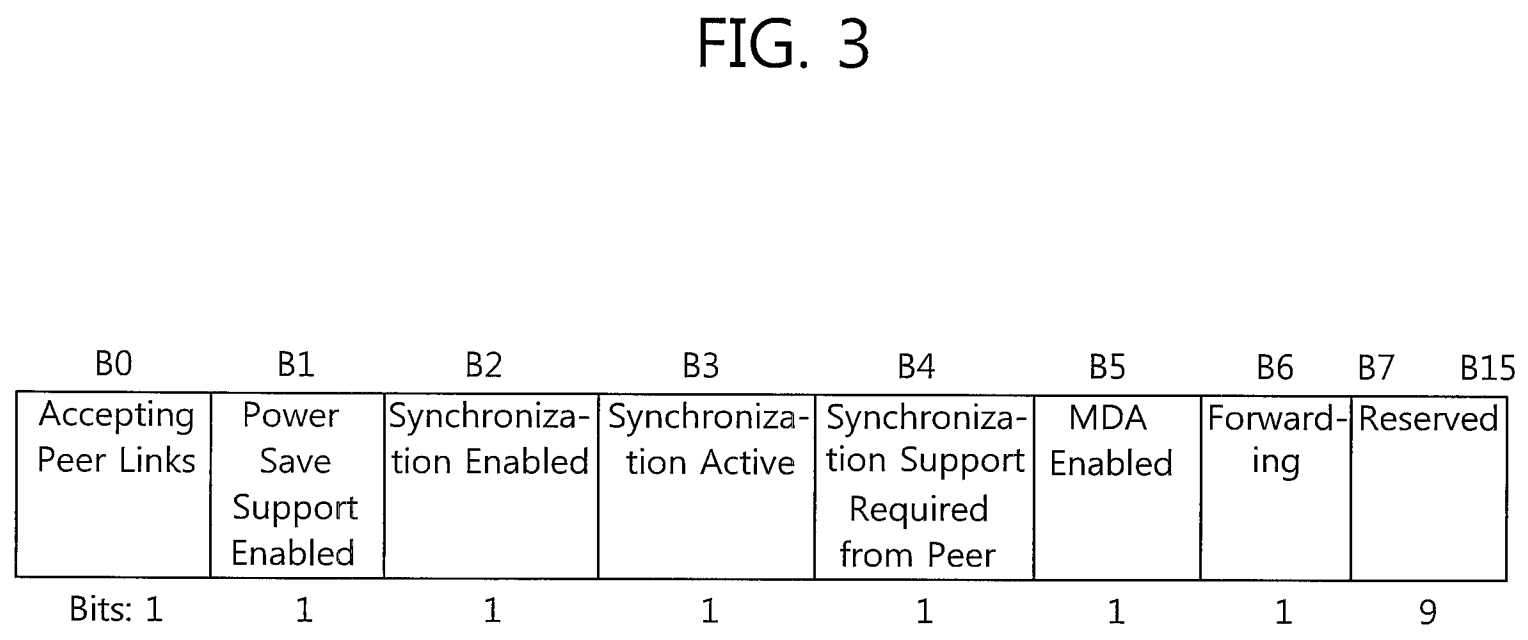

| B0 | B1 | B2 | B3 | B4 | B5 | B6 | B7 B15 |
|---|---|---|---|---|---|---|---|
| Accepting Peer Links | Power Save Support Enabled | Synchronization Enabled | Synchronization Active | Synchronization Support Required from Peer | MDA Enabled | Forwarding | Reserved |
| Bits: 1 | 1 | 1 | 1 | 1 | 1 | 1 | 9 |

FIG. 6

| Octets:1 | 1 | 1 | 1 | 1 | 4 | 6 | 4 | 0 or 6 | 4 |
|---|---|---|---|---|---|---|---|---|---|
| Element ID | Length | Flags | Hop-count | Time to Live | PREQ ID | Originator Address | Originator Sequence Numner | Proxied Address | Lifetime |

| 4 | 1 | 1 | 6 | 4 | ... | 1 | 6 | 4 |
|---|---|---|---|---|---|---|---|---|
| Metric | Destination Count | Per Destination Flags #1 | Destination Address #1 | Destination Seq. Num. #1 | ... | Per Destination Flags #N | Destination Address #N | Destination Seq. Num. #N |

FIG. 7

| Octets:1 | 1 | 1 | 1 | 1 | 6 | 4 | 0 or 6 | 4 |
|---|---|---|---|---|---|---|---|---|
| ID | Length | Flags | Hop-count | Time to Live | Destination Address | Destination Seq. Num. | Destination Proxied Address | Lifetime |

| 4 | 6 | 4 |
|---|---|---|
| Metric | Originator Address #1 | Originator Seq.Num |

FIG. 9

| ID | Length | Flags | PU Sequence Number | Proxy Address | Number of proxied Aaddress (N) | Proxied MAC Address #1 | ... | Proxied MAC Address #N |
|---|---|---|---|---|---|---|---|---|
| Octets:1 | 1 | 1 | 1 | 6 | 1 | 6 | | 6 |

FIG. 10

| Order | Information |
| --- | --- |
| 1 | Mesh Header |
| 2 | Category |
| 3 | Action Value |
| 4 | Proxy Update elements |

FIG. 11

| Order | Information |
| --- | --- |
| 1 | Mesh Header |
| 2 | Category |
| 3 | Action Value |
| 4 | Proxy Update Confirmation element |

FIG. 12

| Mesh Flags | Mesh Time To Live (TTL) | Mesh Sequence Number | Mesh Address Extension (present in some configurations) |
|---|---|---|---|
| Octets:1 | 1 | 4 | 0,6,12,or 18 |

METHOD OF UPDATING PROXY INFORMATION

CROSS-REFERENCE TO RELATED APPLICATIONS

This application claims priority under 35 U.S.C. §119(a) on U.S. Provisional Application No. 61/036,522 filed on Mar. 14, 2008, which is hereby incorporated by reference in its entirety herein.

BACKGROUND

1. Field of the Invention

The present invention relates to wireless communication and, more particularly, to an interworking technique between a mesh network and an external network.

2. Related Art

Recently, diverse wireless communication technologies are under development in line with the advancement of information communication technology. Among them, a wireless local area network (WLAN) is a technique allowing mobile terminals such as personal digital assistants (PDAs), laptop computers, portable multimedia players (PMPs), and the like, to wirelessly access the high speed Internet at homes or offices or in a particular service providing area based on a radio frequency technology.

Communications in the WLAN in conformity with the IEEE 802.11 are presupposed to be performed within an area called a basic service set (BSS). The BSS area may vary according to propagation characteristics of a wireless medium, so its boundary is somewhat indefinite. The BSS may be classified into an independent BSS (IBSS) and an infrastructure BSS. The former establishes a self-contained network, not allowing an access to a distribution system (DS), and the latter, which includes one or more access points (APs), a DS, and the like, generally refers to a BSS in which an AP is used for every communication process including communications between stations (STAs).

A station (STA) that intends to access a wireless network may search an accessible wireless network (BSS or IBSS), namely, a candidate AP, by using two methods as follows.

A first method is a passive scanning method using a beacon frame transmitted from an AP (or STA). Namely, an STA, which wants to access a wireless network, may receive beacon frames periodically transmitted from an AP that manages a pertinent BSS (or IBSS), and search an access BSS or IBSS.

A second method is an active scanning method. In this method, an STA, which wants to access a wireless network, first transmits a probe request frame. Then, an STA or an AP, which has received the probe request frame, responds by a probe response frame.

In the WLAN, a mesh network is defined as a special type of network. The mesh network may be a network supporting direct communications between a plurality of wireless devices having a relay function, without using an access point (AP). In terms of function, a distribution system (DS) of an AP may be substituted by interoperable wireless links or multi-hop paths between a plurality of APs. The mesh network allows one wireless device to establish a peer-to-peer wireless link with neighbor wireless devices and/or APs, having an advantage of enabling more flexible wireless connections.

In the mesh network, one wireless device may be connected to a plurality of wireless devices, establishing a plurality of communication paths. Such communication paths between the wireless devices are called wireless mesh links or simply mesh links or peer links. The wireless devices are called mesh points (MPs) but not meant to be limited thereto. Among the MPs, an MP that performs an AP function in addition to its relay function as described above is called a mesh access point (MAP).

The mesh network has advantages of flexibility in network establishment, reliability according to a detour path, and reduction in power consumption resulting from the reduction in a communication distance. In more detail the use of the mesh network enables MPs to establish a flexible network therebetween even in an area in which no communication network has been established.

In addition, in the mesh network, a plurality of detour paths can be secured as the plurality of MPs are connected to each other, so even if one MP has a trouble, data can be transmitted via another path. Also, although a communication coverage of one MP is not large, it can communicate by way of an adjacent MP, and thus, long distance (remote, wide area) communication can be performed even at a low power level.

However, the active scanning method employed by the STA that wants to access a wireless network cannot be applied as it is to a procedure for an MP to establish a new mesh network with another MP or access an established mesh network. The reason is because, a non-MP STA (when a station is simply mentioned, it refers to a non-AP STA without an MP function), an MP, a MAP, a non-MP AP (when an AP is simply mentioned, it refers to an AP without an MP function) may coexist in the mesh network, and in this situation the STA or the AP cannot become a candidate MP with which an MP can establish a mesh network.

In particular, the STA not supporting the wireless mesh network performs communication via the MAP, and in this case, those STAs not supporting the mesh network in conformity with IEEE 802.11s have connectivity only with the MAP. Thus, research on a method for transferring information about the STAs and the MAP having connectivity with the STAs to a mesh portal needs to be conducted to allow the STAs to interwork with an external network via the mesh portal.

SUMMARY

Therefore, an object of the present invention is to provide a method for providing information about a mesh access point (MAP) having connectivity with stations (STAs) not supporting a mesh network in conformity with IEEE 802.11s by a mesh portal to allow the STAs to interwork with an external network via the mesh portal.

Another object of the present invention is to reduce overhead possibly generated in the process. In addition, when a station 1 (STA 1) is associated with a MAP 1, if the mesh portal wants to transmit and receive data to and from the STA 1, it should know to which MAP the STA 1 is connected.

To this end, the MAP 1 needs to inform the mesh portal about its proxy information, namely, a MAC address of the STA 1.

According to an aspect of the present invention, there is provided a method of updating proxy information in a mesh network, the method including: transmitting a first multi-hop management frame from a source mesh point (MP) to a destination MP, the first multi-hop management frame comprising a proxy update information element (IE) to update the source MP's proxy information; and receiving a second multi-hop management frame from the destination MP, the second multi-hop management frame comprising a proxy update confirmation IE in response to the first multi-hop management frame.

In the embodiments of the present invention, if there exists an STA not supporting a wireless mesh network, information about the STA or information about a MAP to which the STA is connected can be provided to a mesh portal without generating unnecessary overhead.

BRIEF DESCRIPTION OF THE DRAWINGS

FIG. 2 illustrates a mesh configuration element format.

FIG. 3 illustrates a mesh capability field among the mesh configuration elements.

FIG. 6 illustrates a path request (PREQ) IE.

FIG. 7 illustrates a path reply (PREP) IE.

FIG. 9 illustrates a proxy update IE format, one example of proxy information provided to a mesh portal, according to an embodiment of the present invention.

FIG. 10 illustrates a proxy update multi-hop management frame.

FIG. 11 illustrates a proxy update confirmation multi-hop management frame.

FIG. 12 illustrates a mesh header format.

DESCRIPTION OF EXEMPLARY EMBODIMENTS

Figure 1:
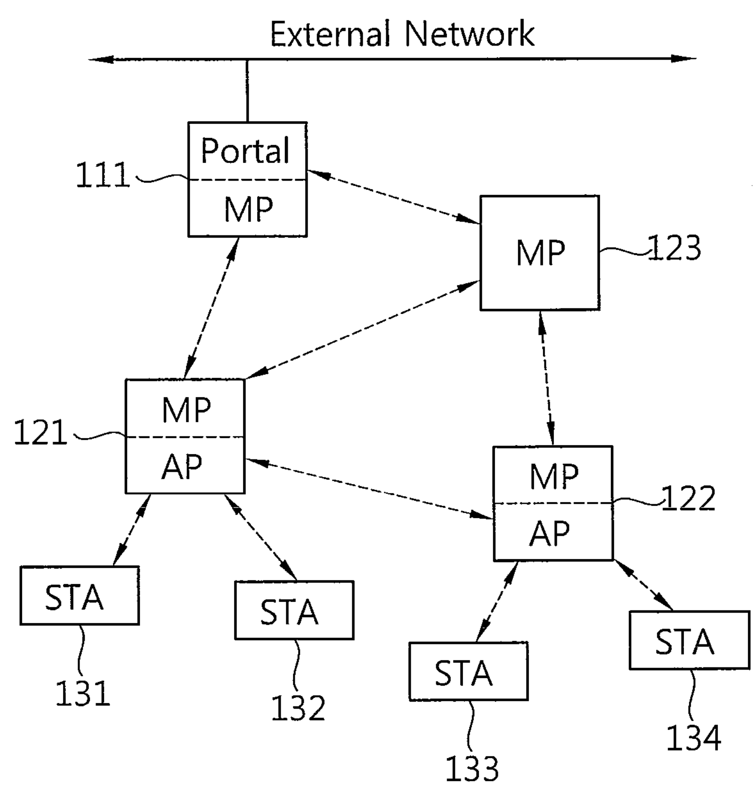
FIG. 1 illustrates the configuration of a wireless mesh network.

FIG. 1 illustrates the configuration of a wireless mesh network.

In a wireless local area network (WLAN), a mesh network is defined as a special type of network. The mesh network may be a network supporting direct communications between a plurality of wireless devices having a relay function, without using an access point (AP). In terms of function, a distribution system (DS) of an AP may be substituted by multi-hop paths between the plurality of wireless devices. The mesh network allows one wireless device to establish a peer-to-peer wireless link (peer link or mesh link) with neighbor wireless devices and such peer link may operate as multi-hop, having an advantage of enabling more flexible wireless connections.

The wireless mesh network has a unique mesh identifier, which is used to identify a group of mesh points (MPs) constituting the mesh network. How to assign the mesh identifier is not limited.

With reference to FIG. 1, the mesh network includes one or more stations STAs 131, 132, 133, and 134 and one or more wireless devices, namely, MPs 111, 121, 122, and 123. Among the MPs, the MPs 121 and 122 have the stations STAs 131, 132, 133, and 134 associated thereto, so the corresponding MPs 121 and 122 are MPs that also serve as an access point (AP), namely, MAPs. The MP 111 is connected with an external network through a fixed line or wirelessly, which is called a mesh portal. The mesh portal is an MP serving as a gateway between the external network and the mesh network.

The stations STAs 131 to 134, certain function mediums including a medium access control (MAC) following the definition of IEEE 802.11 standards and a physical layer interface with respect to a wireless medium, are non-AP stations. Besides the name of wireless stations, the STAs 131 to 134 may be also referred to by other names such as wireless transmit/receive unit (WTRU), user equipment (UE), mobile station (MS), mobile subscriber unit, and the like.

The MPs 111, 121, 122, and 123 are entities constituting the wireless mesh network, and function entities of IEEE 802.11 including the MAC following the definition of IEEE 802.11 standards and the physical layer interface. The MPs 111, 121, 122, and 123 are wireless devices supporting mesh services which include general services allowing the MPs constituting the mesh network to communicate directly with each other.

Two MPs, e.g., MPs 121 and 123, providing the mesh services communicate via a mesh link or a peer link, namely, a direct link established between the two MPs. The MPs 111, 121, 122, and 123 each search (discover) one or more candidate MPs through the active scanning or passive scanning method as described above, and then establish mesh links with the candidate MPs according to a general link setup procedure.

If two MPs are far away from each other, or if a state of the mesh link between two MPs is not good, the MPs may communicate by way of another MP that also constitutes the mesh network. Such an intermediate MP relaying communication between the MPs may be called a 'relay MP'.

In order for two or more MPs to establish a peer link to form the mesh network or in order for another MP to participate in the established mesh network, mesh profiles of the MPs establishing the peer link should be consistent with each other. The MPs support at least one mesh profile. The mesh profile includes a mesh ID, a path selection protocol identifier, and a path selection metric identifier. In addition, the mesh profile may further include a congestion control mode identifier and the like.

As mentioned above, the MP that additionally performs the function of AP among the MPs is particularly called the MAP. Thus, the MAPs 121 and 122 also serve as APs for an associated station set and connected to the MAPs 121 and 122 in addition to the function of the MPs as described above. The AP may be also called by other names such as centralized controller, base station (BS), node-B, site controller, and the like.

FIG. 2 illustrates a mesh configuration element format, and FIG. 3 illustrates a mesh capability field among the mesh configuration elements.

In order for an MP to participate in the wireless mesh network in conformity with the IEEE 802.11s, a mesh discovery process is required.

The MP has a mesh profile including a mesh identifier, a path selection protocol identifier, a path selection metric identifier, a congestion control mode identifier, and the like.

The MP may participate in the mesh network, provided its mesh profile is consistent with that of a neighbor MP. The mesh discovery process refers to a process for discovering a neighbor MP whose mesh profile is consistent with that of the MP.

In order to allow discovering such neighbor MP, a mesh identifier is included in a probe request frame. In this case, MPs having the same mesh identifier respond by a probe response frame.

The probe response frame includes a mesh configuration element. Profile information of the MPs that have responded by the probe response frame can be obtained through information included in the mesh configuration element.

Instead of the above-described process, a neighbor MP may be discovered by receiving beacons periodically transmitted by the MPs, without performing the probe request and probe response process.

When a neighbor MP is discovered through the mesh discovery process, the MP attempts peering with the discovered neighbor MP.

Peering refers to establishing a logical link between the MPs, and the peered MP is called a peer MP. In the wireless mesh network, mesh data frames may be transmitted or received only between the peer MPs.

For peering, the MPs transmit and receive a peer link open frame and a peer link confirm frame.

Figure 4:
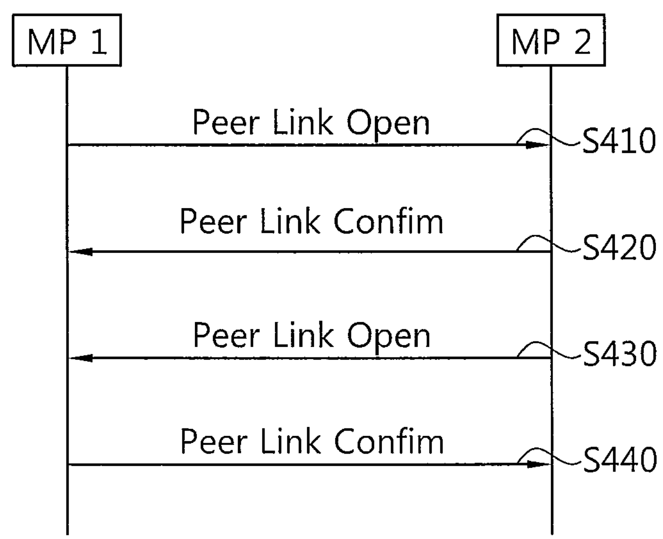
FIG. 4 illustrates a peer link management scheme.

FIG. 4 illustrates a peer link management scheme.

When an MP 1 transmits a peer link open frame (S410), an MP 2 transmits a peer link confirm frame (S420). When the MP 2 transmits a peer link open frame (S430), the MP 1 transmits a peer link confirm frame (S440). The MP1 and the MP2 are two MPs arbitrarily selected from among the plurality of MPs belonging to the mesh network (either MP transmits the peer link open frame and receives the peer link confirm frame).

A peer link management procedure is performed through the process of transmitting and receiving the peer link open frame and transmitting and receiving the peer link confirm frame by the two MPs. Namely, the process of transmitting the peer link open frame and the peer link confirm frame is repeatedly performed according to transmission directions.

The MPs set information such as a link ID and the like through the peer link open frame and the peer link confirm frame.

Figure 5:
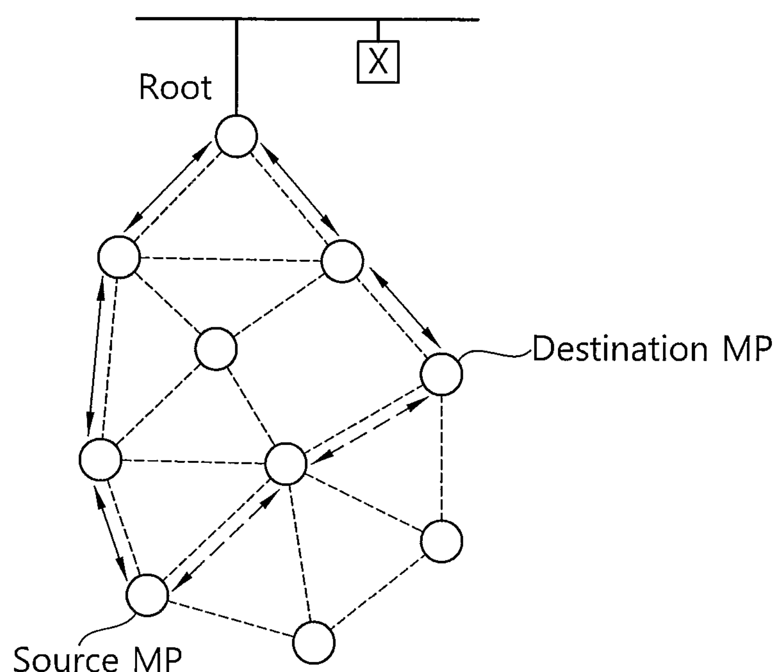
FIG. 5 illustrates an operation scheme of a hybrid wireless mesh protocol (HWMP).

FIG. 5 illustrates an operation scheme of a hybrid wireless mesh protocol (HWMP).

The HWMP is used as a path selection protocol in the mesh network. The HWMP may be divided into two types of modes: a proactive tree building mode and an on-demand mode.

A root exists in the proactive tree building mode. The root periodically transmits a proactive path request (PREQ) or proactive root announcement (RANN) frame. Accordingly, a path is previously formed between the root and the MPs.

When an MP transmits a data frame, the data frame may be relayed so as to be transmitted via the root. The root relays the data frame from the source MP to a destination MP. Here, a path from the source MP to the root and a path from the root to each destination MP are previously established.

Thereafter, the destination MP starts discovering an on-demand path toward the source MP according to an on-demand mode scheme. In this case, an AODV routing protocol may be used and operate in a layer 2, and a link metric may be set as an airtime cost, reflecting the characteristics of the IEEE 802.11 WLAN.

The destination MP floods the RREQ toward the source MP, and when the source MP receives the RREQ, the destination MP responds by the RREP. The frame formats of the PREQ (Path Request) IE (Information Element) and the PREP (Path Reply) IE will now be described with reference to FIGS. 6 and 7.

FIG. 6 illustrates a path request (PREQ) IE, and FIG. 7 illustrates a path reply (PREP) IE. The PREQ IE and the PREP IE constitute a PREQ frame and a PREP frame, respectively.

An HWMP IE includes a path request (PREQ), a path reply (PREP), a path error (PERR), and a root announcement (RANN).

The PREQ IE includes fields of Element ID, Length, Flags, Hop-count, Time to Live, PREQ ID, Originator address, Originator Sequence Number, Proxied Address, Lifetime, Metric, Destination Count, Per Destination Flags #1, Destination Address #1, Destination Sequence Number #1 to Per Destination Flags #N, Destination Address #N, Destination Sequence Number #N.

The PREP IE includes fields of ID field, Length, Flags, Hopcount, Time to Live, Destination Address, Destination sequence Number, Destination Proxied Address, Lifetime, Metric, Originator Address, Originator Sequence Number.

Figure 8:
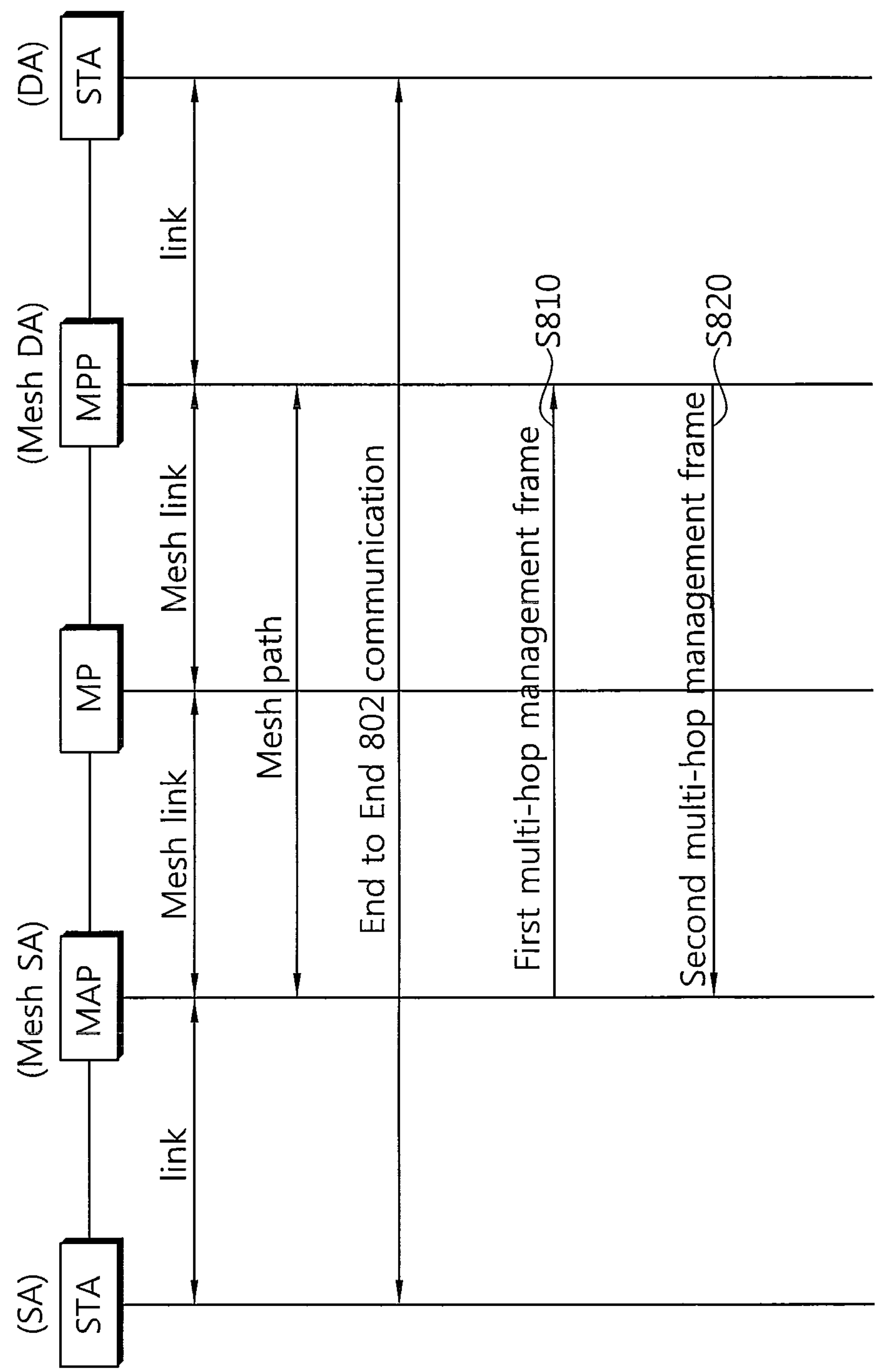
FIG. 8 is a flow chart illustrating the process of a proxy updating method according to an embodiment of the present invention.

FIG. 8 is a flow chart illustrating the process of a proxy updating method according to an embodiment of the present invention.

Here, a case where the source MP, which is a MAP, is connected with STAs not supporting the mesh network and a destination MP serves as a mesh portal will be taken as an example. Thus, in this embodiment, the source MP transfers information of the STAs to the destination MP, the mesh portal.

Proxy information or proxy update information transmitted by the source MP includes MAC addresses of the STAs connected to the source MP.

First, the source MP transmits a multi-hop management frame including a proxy update IE to the destination MP (S810). Here, the multi-hop management frame first transmitted by the source MP to the destination MP to update proxy information will be referred to as a 'first multi-hop management frame'. The first multi-hop management frame includes the proxy update IE. The proxy update IE includes proxy information or proxy update information of the source MP, and as stated above, the MAC address of the STAs connected to the corresponding source MP may be included in the proxy update IE.

Here, the first multi-hop management frame is transmitted by a hop-by-hop method in a multi-hop environment, not by such related art broadcasting method. The frame format used in the transmission method may be referred to as a multi-hop management frame format or a multi-hop action frame format. Hereinafter, the frame transmitted for proxy information updating according to an embodiment of the present invention will be referred to as the 'multi-hop management frame', but it is obvious that the technical scope of the present invention is not limited by the name of the frame.

The proxy information or the proxy update information is defined to be forwarded from the source MP to the destination MP. The multi-hop action frame or the multi-hop management frame format includes an action field. For example, a field value of the action field indicates whether a proxy update IE or a proxy update confirmation IE is included in the multi-hop management frame.

For example, provided the proxy information included in the multi-hop management frame is one of the proxy update IE and the proxy update confirmation IE, it may be previously determined such that if the field value of the action field is set as 0, the proxy information is the proxy update IE, and if the field value is set as 1, the proxy information is the proxy update confirmation IE, or vice versa.

Besides the action field, the multi-hop management frame further includes a mesh header field, a category field, a proxy update element field. The proxy update IE or the proxy update confirmation IE is included in the proxy update element field.

The source MP receives a second multi-hop management frame from the destination MP in response to the proxy update IE of the first multi-hop management frame (S820). If the first multi-hop management frame is said to be a proxy update confirmation multi-hop frame, the corresponding second multi-hop management frame could be a proxy update confirmation multi-hop management frame.

Accordingly, the first multi-hop management frame includes the proxy update IE, and the second multi-hop management frame includes the proxy update confirmation IE.

The second multi-hop management frame may also include an action field and a proxy update confirmation element. The proxy update confirmation element corresponds to the proxy update element. Formats of the proxy update multi-hop management frame and the proxy update confirmation multi-hop management frame will be described later with reference to FIGS. 9 and 10.

The proxy update multi-hop management frame includes a proxy update element field besides the action field. The MAC addresses and the like, the information of the connected STAs, are included in the proxy update element field. Specifically, the MAC addresses and the like may be included in a proxied MAC address field of the proxy update element field.

If the destination MP transmits the information of the STAs to the source MP, the information of the STAs may be included in a proxy update confirmation element field of the proxy update confirmation multi-hop management frame, the proxy update confirmation IE.

The destination MP, the mesh portal, can recognize the MAC addresses of the STAs connected to the source MP as well as a MAC address of the source MP via the proxy update IE transmitted from the source MP.

Here, the environment in which the proxy update multi-hop management frame and the proxy update confirmation multi-hop management frame, or the first multi-hop management frame and the second multi-hop management frame are transmitted is the multi-hop environment, so there may be any other MPs between the source MP and the destination MP and one or more MPs may forward the multi-hop management frames to transmit them.

FIG. 9 illustrates the proxy update IE format, one example of the proxy information provided to the mesh portal, according to an embodiment of the present invention.

The proxy update IE may be included in the proxy update element field of the first multi-hop management frame.

The proxy update element field includes a Flags field, a Proxy Address field, a Number of Proxied Address field, and a Proxied MAC Address field.

The Proxy Update element is transmitted by a source MP to a destination MP to update its proxy information. This element is transmitted using group addresses or individual addresses. The Element ID is set for this information element.

The Flags field is set as follows; 'Bit 0: 0=add proxy information, 1=delete proxy information. Bit 1-7: Reserved'

The PU Sequence Number field is coded as an unsigned integer and is set to the sequence number of the PU. The Source MP shall set the PU Sequence Number field in the PU Element to a value from a single modulo-256 counter that is incrementing by 1 for each new PU.

The Proxy Address field is represented as a 48-bit MAC address and is set to the MAC address of proxy MP. The Number of Proxied Address field is coded as an unsigned integer and is set to the number of proxied addresses reported to the destination MP. And the Proxied MAC Address is represented as a 48-bit MAC address and is the MAC address of the proxied entities. The proxied entities may refer to the STAs not supporting the wireless mesh network and proxied by the MAP.

According to an embodiment of the present invention, proxy information of the MAP can be transferred to the mesh portal and the like. The proxy information refers to MAC address information with respect to STAs which are connected to the MAP and do not support the mesh network service of IEEE 802.11.

Here, the Proxy Address field indicates a MAC address of the MAP serving as a proxy. The MAP is an MP serving an access point, to which the STAs not supporting the mesh network of IEEE 802.11s are connected. The STAs not supporting the mesh network of IEEE 802.11s have connectivity only with the MAP The Proxied MAC Address field indicates a MAC address of an STA serviced by a proxy. Namely, the Proxied MAC Address field indicates the MAC addresses of the STAs connected to the MAP.

The MAP responds to the PREQ frame, the PREP frame, and the like, on behalf of the STAs connected thereto, and plays the role of the source MP or the destination MP for the corresponding STAs in the wireless mesh network.

One way to transfer the Proxy Update IE among the mesh portal, the mesh AP, and the MPs is flooding the Proxy Update E. However, if the Proxy Update IE is flooded, every MP in the wireless mesh network would get proxy information but, disadvantageously, flooding overhead would increase.

Thus, the present invention proposes a method for transferring the proxy information using a multi-hop action frame. Namely, in this method, proxy updating is performed by transmitting proxy information or proxy update information in a hop-by-hop manner.

Accordingly, the mesh portal, the MAP, or the MPs intending to transfer Proxy Update IE uses the proxy update multi-hop management frame. Hereinafter, a frame used by the source MP to transmit the Proxy Update IE to the destination MP is referred to as a Proxy Update multi-hop management frame. A frame used by the destination MP to transmit the Proxy Update confirmation IE to the source MP is referred to as a Proxy Update confirmation multi-hop management frame.

FIG. 10 illustrates the Proxy Update multi-hop management frame, and FIG. 11 illustrates the Proxy Update confirmation multi-hop management frame.

The Proxy Update multi-hop management frame corresponds to the first multi-hop management frame and the Proxy Update confirmation multi-hop management frame corresponds to the second multi-hop management frame as described above with reference to FIG. 8.

The Proxy Update multi-hop management frame, one of multi-hop management frames, is based on the presupposition that the source MP and the destination MP are located at multi-hop, not a single-hop.

The Proxy Update multi-hop management frame as shown in FIG. 10 includes a Mesh Header field, a Category field, an Action field, and a Proxy Update IE field. The Proxy Update confirmation multi-hop management frame as shown in FIG. 11 includes a Mesh Header field, a Category field, an Action field, and a Proxy Update confirmation IE field.

The category field indicates whether or not a multi-hop management frame is to transfer mesh proxy information. As afore-mentioned with reference to FIG. 8, the field value of the action field indicates whether or not the multi-hop management frame is the Proxy Update multi-hop management frame or the Proxy Update confirmation multi-hop management frame.

In an embodiment of the present invention, the multi-hop management frame may include four address fields: a Receiver Address field, a Transmitter Address field, a Destination Address field, and a Source Address field. The four address fields may be included in the mesh header field (to be described).

The Receiver Address (RA) indicates a MAC address of a receiver at a local link. The Transmitter Address (TA) indicates a MAC address of a transmitter at the local link. The Destination Address (DA) indicates a MAC address of a destination at an end-to-end link. The Source Address (SA) indicates a MAC address of a source at the end-to-end link. The format of the mesh header field will be described later with reference to FIG. 12.

FIG. 12 illustrates a mesh header format.

The mesh header field is required for a multi-hop delivery. The mesh header field includes a Mesh Time to Live (TTL) field, a Mesh Sequence Number field, and a Mesh Address Extension mode field. The Mesh Time To Live (TTL) field means a maximum hop account. The Mesh Sequence Number field is used as an end-to-end ID.

The Mesh Address Extension mode field is used only information about a proxied STA is required in addition to a Receiver Mesh Point, a Source Mesh Point, and a Destination Mesh Point. However, the Mesh Address Extension mode field may not be used in the Proxy Update multi-hop management frame proposed in the present invention.

The intermediate MPs or intermediate MAPs, not the destination MP, receive the Proxy Update multi-hop management frame, they perform a forwarding process toward the destination MP and do not update proxy information.

Upon receiving the Proxy Update multi-hop management frame, the destination MP responds to the source MP via a corresponding Proxy Update Confirmation multi-hop management frame.

End-to-end mesh points exchange MAC addresses of proxied STAs serviced by them via the Proxy Update multi-hop management frame and the Proxy Update Confirmation multi-hop management frame.

According to an embodiment of the present invention, the proxy information is transferred only to the end-to-end mesh points through unicast frames, not transferred in a broadcast manner, so protocol overhead with respect to Proxy Update can be reduced.

The methods as described above can be performed by processors such as a microprocessor, a controller, a microcontroller, an application specific integrated circuit (ASIC), and the like, according to software coded to perform such methods or program codes, or by a processor of a user equipment (UE). Designing, developing, and implementing such codes will be obvious to the skilled person in the art based on the description of the present invention.

The preferred embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

What is claimed is:

1. A method of updating proxy information in a mesh network, the method comprising:

transmitting a first multi-hop management frame of a source mesh point (MP) to a destination MP via a first mesh path, the first multi-hop management frame comprising a proxy update information to inform the destination MP about proxy information of at least one external address that is reachable through a proxy MP; and receiving a second multi-hop management frame from the destination MP via a second mesh path, the second multi-hop management frame comprising a proxy update confirmation information to inform the source MP that the proxy update information is properly received by the destination MP, wherein the proxy update information comprises a flags field indicating whether the proxy information is added or deleted, a proxy address field indicating a medium access control (MAC) address of the proxy MP, a proxy update sequence number indicating a sequence number of the proxy update information, and a proxied address field indicating a MAC address of a station proxied by the proxy MP, and wherein the proxy update confirmation information comprises an address of the source MP that originates the proxy update information, wherein the sequence number of the proxy update information is incremented by 1 before the proxy update information is transmitted to the destination MP, and wherein the destination MP updates proxy information of the destination MP when addresses in the proxied address field and the proxy address field do not exist at the destination MP and when a value of the sequence number of the proxy update information is larger than a value of a sequence number in the proxy information of the destination MP.

2. The method of claim 1, wherein the first and second multi-hop management frame each comprises an action field and a proxy update element, the action field indicating whether a corresponding proxy update element is the proxy update information or the proxy update confirmation information.

3. The method of claim 2, wherein the first and second multi-hop management frame each comprise a category field indicating that the multi-hop management frame is used for forwarding mesh proxy information.

4. The method of claim 1, wherein the first multi-hop management frame comprises a mesh header that includes a first address indicating a receiver of the first multi-hop management frame, a second address indicating a transmitter of the first multi-hop management frame, a third address indicating a source station of the first mesh path and a fourth address indicating a destination station of the first mesh path, and wherein the second multi-hop management frame comprises a mesh header that includes a first address indicating a receiver of the second multi-hop management frame, a second address indicating a transmitter of the second multi-hop management frame, a third address indicating a source station of the second mesh path and a fourth address indicating a destination station of the second mesh path.

5. The method of claim 1, wherein the source MP is a mesh access point (MAP) and the destination MP is a mesh portal.

6. A terminal configured to update proxy information in a mesh network, comprising:

a processor configured to transmit a first multi-hop management frame of a source mesh point (MP) to a destination MP via a first mesh path, the first multi-hop management frame comprising a proxy update information element to inform the destination MP about proxy information of at least one external address that is reachable through a proxy MP, and receive a second multi-hop management frame from the destination MP via a second mesh path, the second multi-hop management frame comprising a proxy update confirmation information to inform the source MP that the proxy update information is properly received by the destination MP, wherein the proxy update information comprises a flags field indicating whether the proxy information is added or deleted, a proxy address field indicating a medium access control (MAC) address of the proxy MP, a proxy update sequence number indicating a sequence number of the proxy update information, and a proxied address field indicating a MAC address of a station proxied by the proxy MP, and wherein the proxy update confirmation information comprises an address of the source MP that originates the proxy update information, wherein the sequence number of the proxy update information is incremented by 1 before the proxy update information is transmitted to the destination MP, and wherein the destination MP updates proxy information of the destination MP when addresses in the proxied address field and the proxy address field do not exist at the destination MP and when a value of the sequence number of the proxy update information is larger than a value of a sequence number in the proxy information of the destination MP.

7. The terminal of claim 6, wherein the first and second multi-hop management frame each comprises an action field and a proxy update element, the action field indicating whether a corresponding proxy update element is the proxy update information or the proxy update confirmation information.

8. The terminal of claim 7, wherein the first and second multi-hop management frame each comprise a category field indicating that the multi-hop management frame is used for forwarding mesh proxy information.

9. The terminal of claim 6, wherein the first multi-hop management frame each comprise a mesh header that includes a first address indicating a receiver of the first multi-hop management frame, a second address indicating a transmitter of the first multi-hop management frame, a third address indicating a source station of the first mesh path and a fourth address indicating a destination station of the first mesh path, and wherein the second multi-hop management frame comprises a mesh header that includes a first address indicating a receiver of the second multi-hop management frame, a second address indicating a transmitter of the second multi-hop management frame, a third address indicating a source station of the second mesh path and a fourth address indicating a destination station of the second mesh path.

10. The terminal of claim 6, wherein the source MP is a mesh access point (MAP) and the destination MP is a mesh portal.

* * * * *